(12) United States Patent
Park et al.

(10) Patent No.: US 9,817,904 B2
(45) Date of Patent: Nov. 14, 2017

(54) METHOD AND SYSTEM FOR GENERATING AUGMENTED PRODUCT SPECIFICATIONS

(71) Applicant: TCL RESEARCH AMERICA INC., San Jose, CA (US)

(72) Inventors: Dae Hoon Park, San Jose, CA (US); Lifan Guo, San Jose, CA (US); Wanying Ding, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 418 days.

(21) Appl. No.: 14/576,433

(22) Filed: Dec. 19, 2014

(65) Prior Publication Data

US 2016/0179966 A1 Jun. 23, 2016

(51) Int. Cl.
*G06F 17/30* (2006.01)
(52) U.S. Cl.
CPC .............................. *G06F 17/30867* (2013.01)
(58) Field of Classification Search
CPC combination set(s) only.
See application file for complete search history.

(56) References Cited

U.S. PATENT DOCUMENTS

| | | | | |
|---|---|---|---|---|
| 6,453,383 B1 * | 9/2002 | Stoddard | ............... | G06F 3/0607 707/999.202 |
| 7,246,110 B1 * | 7/2007 | Musgrove | ............ | G06Q 10/087 |
| 8,051,080 B2 * | 11/2011 | Kraft | ................. | G06F 17/30864 707/736 |
| 2011/0078157 A1 * | 3/2011 | Sun | ........................ | G06Q 30/02 707/749 |
| 2012/0136987 A1 * | 5/2012 | Bostick | ............. | G06F 17/30911 709/224 |
| 2012/0166308 A1 * | 6/2012 | Ahmed | .................. | G06Q 20/12 705/26.41 |
| 2012/0209751 A1 * | 8/2012 | Chen | ..................... | G06Q 30/06 705/27.2 |
| 2012/0300985 A1 * | 11/2012 | Ito | .......................... | G06F 21/32 382/103 |

FOREIGN PATENT DOCUMENTS

CN 103020851 A 4/2013

* cited by examiner

*Primary Examiner* — Etienne Leroux
(74) *Attorney, Agent, or Firm* — Anova Law Group, PLLC

(57) ABSTRACT

The present invention provides a method for providing augmented product specifications based on user reviews. The method obtains input data of specifications and user reviews on a plurality of products, each specification including at least a pair of a feature and a feature-value of the product. The method concatenates the user reviews of the products to form product-documents, each product-document corresponding to the concatenated user reviews of a product. The method further employs a topic model to process the input data and learn topic distributions in the product-documents and word distributions in topics. The topics include specifications of the products. The topic model is a type of statistical model for discovering topics that occur in a collection of product-documents. Based on the topic model, the method can provide augmented specifications including one or more of relevant sentences of the feature-value, feature importance information, and product-specific words of the product.

11 Claims, 9 Drawing Sheets

| | |
|---|---|
| Image Processor | DIGIC 5+ |
| Image Stabilizer | optical (Dynamic Image Stabilizer) |
| Auto Focus | TTL phase detection |
| Auto Focus Points (Zones) Qty | 19 |
| AE/AF Control | Subject-tracking AF |
| Face Detection | Automatic Face Tracking technology |
| Digital Video Format | MOV |
| Image Recording Format | RAW + JPEG |
| Max Video Resolution | 1920 x 1080 |

METHOD AND SYSTEM FOR GENERATING AUGMENTED PRODUCT SPECIFICATIONS

FIELD OF THE DISCLOSURE

The present disclosure relates to the field of information extraction technologies and, more particularly, relates to providing augmented product specifications based on product information and user reviews.

BACKGROUND

When people purchase a product from an online store, they are usually provided with product-related information such as product description, product images, and user reviews. Often, product specification is also provided to specify its features in an organized way, especially for high-technology products that consist of several electronic components, and it is highly informative for users to understand the product. An example of a digital camera product specification is shown in FIG. 1.

However, it is often hard to understand what the contents of product specification really mean when the consumers are unfamiliar with them. For example, when novice consumers read a digital camera's specification, they would not have any idea what the value "TTL phase detection" of feature "Auto Focus" means because they are not familiar with it. Not only such consumers are strange to what the feature value is, but also they do not know what it really means to them.

In order to choose "right" value of a feature, consumers would like to hear direct experience from consumers who own a product equipped with it, which may answer questions such as "is the feature value preferred by others?" A typical product purchase from online stores is depicted in FIG. 2. When a customer clicks a link for a certain product, the customer reads product-related information such as product description, reviews, and specifications. If the customer purchases the product, he or she uses the product for a while and possibly leaves a review to share experience with other people. The consumers can learn what the feature value is through Wikipedia or Web search, but it is laborious to find what other consumers say about a certain feature value from reviews of a product with the feature. Moreover, if the product does not have enough information about the feature, one needs to collect such information from reviews of other products, which is time-consuming.

Opinion mining and summarization have been widely studied. Most of the studies performed research on product review or Weblog data set since people leave rich opinions on them. In order to know the target of opinions and to mine opinions in a more effective way, aspect-based opinion mining and summarization has been studied as a main stream in the field. To find aspects of a product, many studies applied a topic model, which find latent topics from documents. Most existing works in this line of research mine opinions for a product feature, either pre-defined or latent.

Although product specifications have been available in many e-commerce sites, only a limited number of studies used them for product review analysis. For example, Ontology-Supported Polarity Mining (OSPM), which takes advantage of domain ontology database from IMDb, aims to achieve sentiment classification on reviews. However, the method studied only movie properties (features), not feature values. Other methods employ product review analysis, but the goal is document categorization. Product specifications and reviews are also used to build an aspect hierarchy, but the method did not study feature values. Other studies used product specifications to summarize product features, but they also did not study feature values.

Therefore, most topic model-based opinion mining and summarization techniques do not use pre-defined topics (e.g. product specifications) for product review analysis. Further, those opinion mining techniques that incorporates product specifications still fail to address the problem that novice consumers have little knowledge of the actual value corresponding to a feature in product specifications.

The disclosed method and system are directed to solve one or more problems set forth above and other problems.

BRIEF SUMMARY OF THE DISCLOSURE

One aspect of the present disclosure provides a method for providing augmented product specifications based on user reviews. The method obtains input data of specifications and user reviews on a plurality of products, each product corresponding to a plurality of specifications and a plurality of user reviews, each specification including at least a pair of a feature and a feature-value of the product. The method concatenates the user reviews of the products to form product-documents, each product-document corresponding to the concatenated user reviews of a product. The method further employs a topic model to process the input data and learn topic distributions in the product-documents and word distributions in topics. The topics include specifications of the products. The topic model is a type of statistical model for discovering topics that occur in a collection of product-documents. Each product-document contains one or more topics, and each topic exists in one or more documents. The method can provide augmented specifications to a user based on the topic model. The augmented specifications include one or more of relevant sentences of the feature-value, feature importance information, and product-specific words of the product.

Another aspect of the present disclosure provides a non-transitory computer-readable medium having computer program for, when being executed by a processor, performing a method for providing augmented product specifications based on user reviews. The method obtains input data of specifications and user reviews on a plurality of products, each product corresponding to a plurality of specifications and a plurality of user reviews, each specification including at least a pair of a feature and a feature-value of the product. The method concatenates the user reviews of the products to form product-documents, each product-document corresponding to the concatenated user reviews of a product. The method further employs a topic model to process the input data and learn topic distributions in the product-documents and word distributions in topics. The topics include specifications of the products. The topic model is a type of statistical model for discovering topics that occur in a collection of product-documents. Each product-document contains one or more topics, and each topic exists in one or more documents. The method can provide augmented specifications to a user based on the topic model. The augmented specifications include one or more of relevant sentences of the feature-value, feature importance information, and product-specific words of the product.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

When a consumer purchases a product from an online store, the consumer is usually provided with product-related information such as product specifications, product images, and user reviews. However, the consumer may not know the meaning of certain product feature and its feature value. The problem becomes more important because the feature values diverge as more high-technology components are developed and a product is equipped with more features.

Indeed, recently manufactured digital cameras or computers often contain more than fifty features with many of them difficult to understand for novice customers. For example, a digital camera "Canon EOS 70D" has 79 features in CNET's product specifications page. It contains many advanced pairs of a feature and its value, such as ("Battery Type", "Canon LP-E6") and ("Light Sensitivity", "ISO 25600"). A novice user may not know if those features are preferred by other users and if they are enough or too much for their use, which may be answered from experience of other users. Each of the following sentences is a manually retrieved sentences from other products for the values "Canon LP-E6" and "ISO 25600", respectively: "The 60D uses the LP-E6 battery like the 7D, which is a nice feature as this battery can often last through a full day of shooting. The only negative issues are . . . , and the highest advertised ISO setting (25600 eq) is too noisy to use."

Through reading such useful review sentences, consumers may learn about the feature values, which may help them choose a proper product for them more efficiently and effectively. For example, a user may know useful information about the battery "Canon LP-E6" from the sentence; it gives a fact that the battery lasts through a full day of shooting and also an opinion that it is a nice feature, which means it is preferred by the author. If the user was considering a camera with a good battery life but did not know about "Canon LP-E6", the retrieved sentence would be very helpful to the user for choosing a product. Although the retrieved sentence may have some inconsistent opinions, readers can still learn from them that there are different opinions on the feature value.

Figures 1, 2:
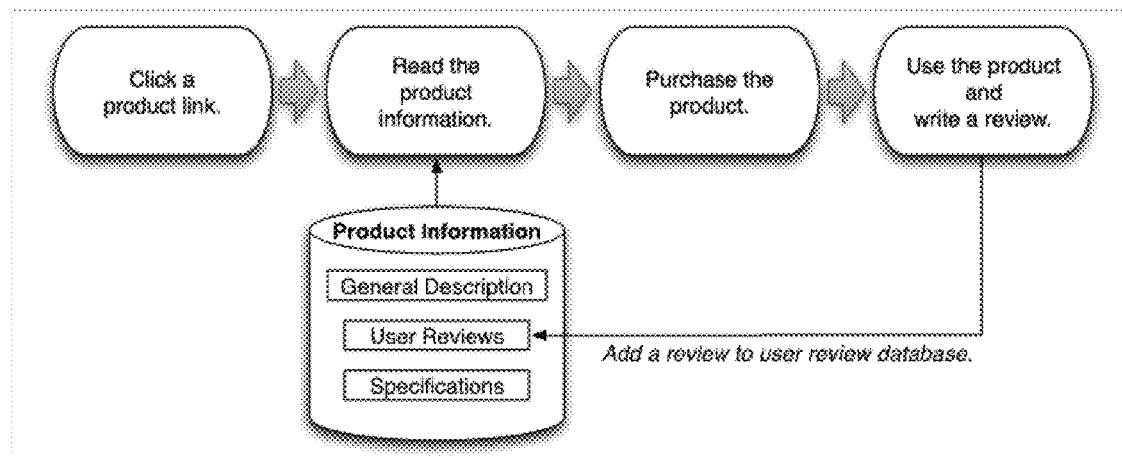
FIG. 1 illustrates a screen shot of an exemplary presentation of product specifications in prior art.
FIG. 2 illustrates a block diagram of an exemplary typical product purchase cycle in prior art.
Figure 3:
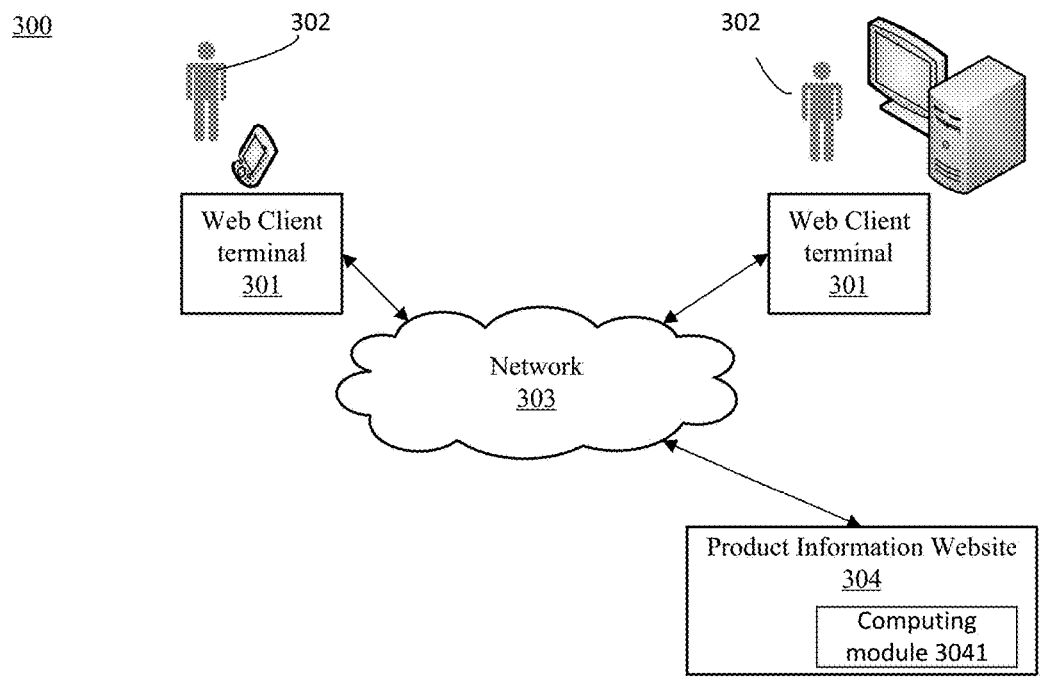
FIG. 3 illustrates an exemplary environment incorporating the disclosed embodiments.

The present disclosure provides a system for automatically generating augmented product specifications based on user reviews. FIG. 3 is an exemplary environment incorporating certain embodiments of the present disclosure. As shown in FIG. 3, environment 300 may include a plurality of web client terminals 301, a network 303 and a product information website 304. Other devices may also be included.

Users 302 may connect to the network 303 (i.e. the Internet) and access the product information website 304 through one of the web client terminals 301. The web client terminals 301 may be any device that connects to the network 303 and allows interaction between the users 302 and the product information website 304, such as desktops, laptops, tablets, smart phones, etc. The product information website 304 may provide information about a variety of products such as model, specifications, price, user reviews, etc. The product information website 304 may also provide product purchase capabilities. The users 302 may browse the product information and buy a product on the product information website 303. The users 302 may leave user reviews for a purchased product. The website 304 may be connected to any appropriate network 303 for accessing, such as the Internet. A computing module 3041 may be configured to generate augmented specifications according to the product information and user reviews. In certain embodiments, the computing module 3041 may be integrated in the product information website 304. In other embodiments, the computing module 3041 may be an independent module that can communicate with the product information website 304.

Figure 4:
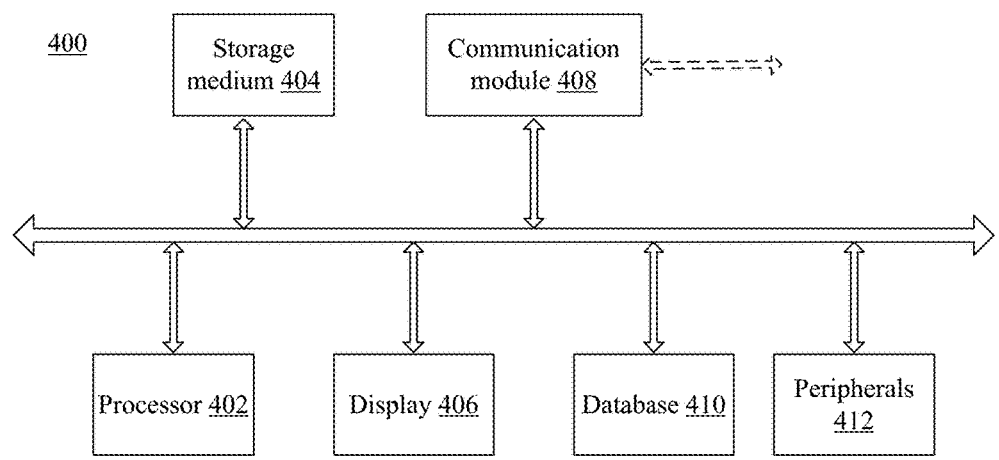
FIG. 4 illustrates an exemplary computing system consistent with the disclosed embodiments.

The computing module 3041 and/or client terminal 301 may be implemented on any appropriate computing platform. FIG. 4 shows a block diagram of an exemplary computing system 400 capable of implementing the system for providing augmented product specifications based on user reviews.

As shown in FIG. 4, computing system 400 may include a processor 402, a storage medium 404, a display 406, a communication module 408, a database 410, and peripherals 412. Certain devices may be omitted and other devices may be included.

Processor 402 may include any appropriate processor or processors. Further, processor 402 can include multiple cores for multi-thread or parallel processing. Storage medium 404 may include memory modules, such as ROM, RAM, flash memory modules, and mass storages, such as CD-ROM and hard disk, etc. Storage medium 404 may store computer programs for implementing various processes when the computer programs are executed by processor 402.

Further, peripherals 412 may include various sensors and other I/O devices, such as keyboard and mouse, and communication module 408 may include certain network interface devices for establishing connections through communication networks. Database 410 may include one or more databases for storing certain data and for performing certain operations on the stored data, such as database searching.

Figure 5:
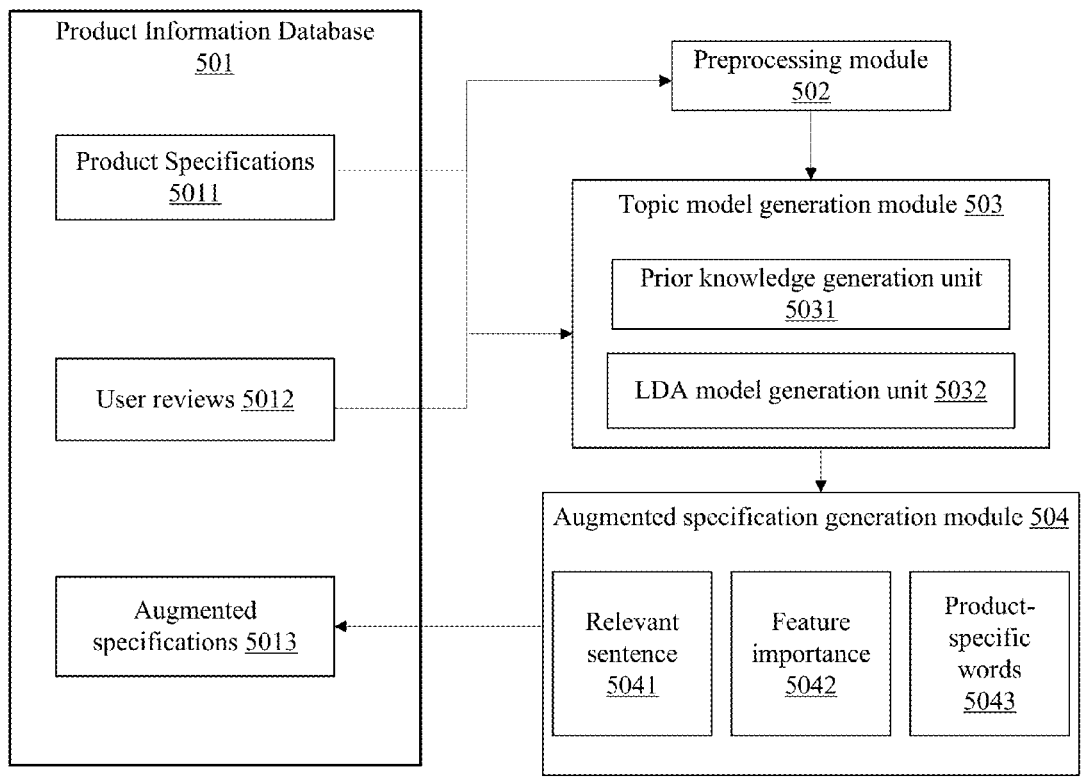
FIG. 5 illustrates a block diagram of an exemplary system for providing augmented product specifications consistent with the present disclosure.

FIG. 5 illustrates a block diagram of an exemplary system for generating augmented product specifications based on user reviews consistent with the disclosed embodiments. As shown in FIG. 5, the system 500 (e.g., the computing module 3041) for generating augmented product specifications may include a product information database 501, a preprocessing module 502, a topic model generation module 503 and an augmented specification generation module 504.

The product database 501 may store data from the product information website 303. Specifically, the product database 501 may store data on product specifications 5011, user reviews 5012 and augmented product specifications 5013.

In operation, when a consumer uses a web client terminal 301 to browse the product information website 303, the consumer may leave a review for a product on the website 303. The collected user reviews 5012 and product specifications 5011 stored in the product information database 501 may be used to generate augmented product specifications 5013. The generated augmented product specifications 5013 may also be stored in the product information database 501. In the present disclosure, one product specification refers to a pair of a feature and a value of the feature, such as (feature "Light sensitivity" with a value "ISO 25600" of a digital camera product). Each product may have a plurality of specifications, i.e., feature-value pairs. The augmented product specifications 5013 may include additional relevant information about the product to help consumers understand the product specifications.

The product specifications 5011 and user reviews 5012 from the product information database 501 may be processed in a preprocessing module 502. The preprocessing module 502 may be configured to process reviews using natural language analysis tools and concatenating all reviews of one product to form a single product document for each document.

The product documents obtained from the preprocessing module 502 may be processed in the topic model generation module 503. In the present disclosure, the topic model refers to a type of statistical model used in natural language processing for discovering topics that occur in a collection of documents. The topic model can examine a set of documents and discover, based on statistics of words in each document, what topics exist in the documents and what word exists in the topics. In other words, the topic model may learn topic distribution in each document and word distribution in each topic.

The topic model generation module 503 may further include a prior knowledge generation unit 5031 and a modified LDA model generation unit 5032. In certain embodiments, a modified Latent Dirichlet allocation (LDA) model may be employed as the topic model. In the LDA model, each document is concatenated review texts of a product, and each topic is a feature-value pair from the product specification.

An LDA model assumes the topic distribution has a Dirichlet prior. That is, the topic distribution follows a Dirichlet distribution. In operation, the LDA model generates each word in a document by drawing two variables according to Dirichlet distribution: different topic distribution in each document and different word distribution in each topic. Since the word distribution in a document is known, as LDA model iterates to generate each word in a document, the LDA model modifies the two variables so that they can be estimated to fit the data as much as possible. The data refers to the given documents (concatenated review texts) and topics (feature-value pairs from the product specifications). Therefore, the LDA model may learn the data and generate the estimated topic distribution in each document and word distribution in each topic.

The modified LDA model generation module 5032 may incorporate prior knowledge to the traditional LDA model. The prior knowledge generation module 5031 may obtain prior knowledge including previously known specific topic distribution in a document and specific word distribution in a topic.

The augmented specification generation module 504 may be configured to generate one or more of relevant sentences 5041, feature importance information 5042 and product-specific words 5043. In certain embodiments, the relevant sentences 5041 of a query may be relevant review sentences generated by an ad-hoc language model retrieval system. The query may be a feature-value pair of a product. The ad-hoc language model retrieval system may retrieve relevant sentences according to the query based on the generated topic model (i.e. topic distribution in document and word distribution in topic). The feature importance information 5042 may be ranked product features based on the generated topic model. The product-specific words 5043 may indicate special words for the product based on the generated topic model.

Figure 6:
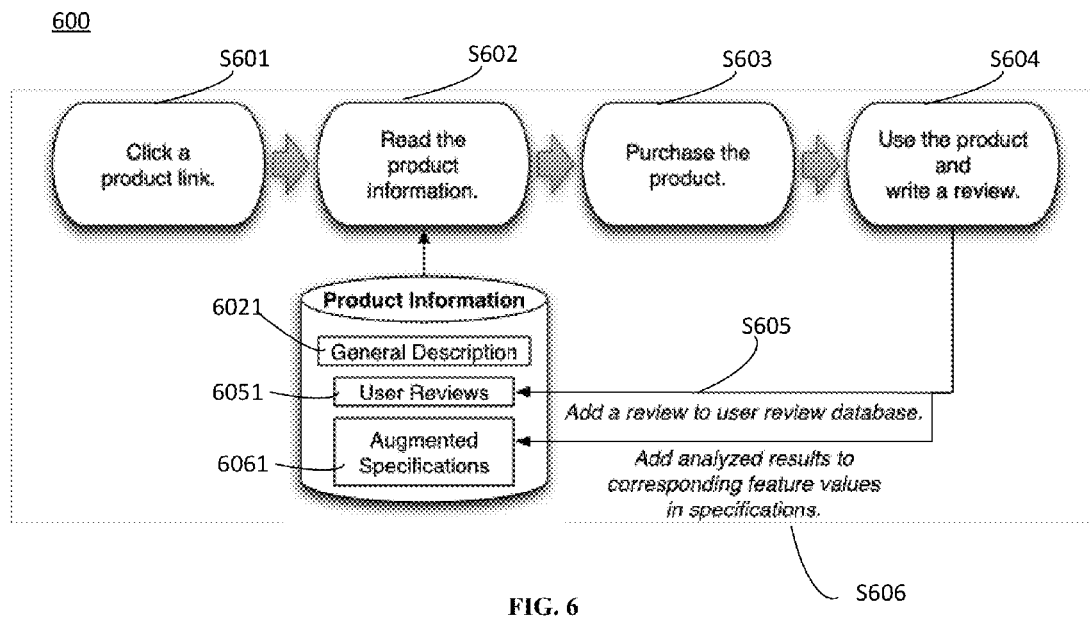
FIG. 6 illustrates a block diagram of an exemplary product purchase cycle consistent with the present disclosure.

FIG. 6 shows an exemplary product purchase cycle 600 implementing the system 500 for generating augmented product specifications. When a customer clicks a link for a certain product (S601), the customer reads product-related information (S602) such as general product descriptions 6021, user reviews 6051 of the product, and augmented specifications 6061. If the customer purchases the product (S603), the customer uses the product for a while and may leave a review to share experience with other people (S604). The review is then added to the user review database for further analysis (S605). The augment product specifications 6061 are generated from accumulated user reviews 6051 (S606). More specifically, with the data of products and their corresponding reviews and specifications, the system 500 for enhancing product purchase experience can automatically analyzes review sentences about a specification and augments specifications with the analysis results.

Figure 7:
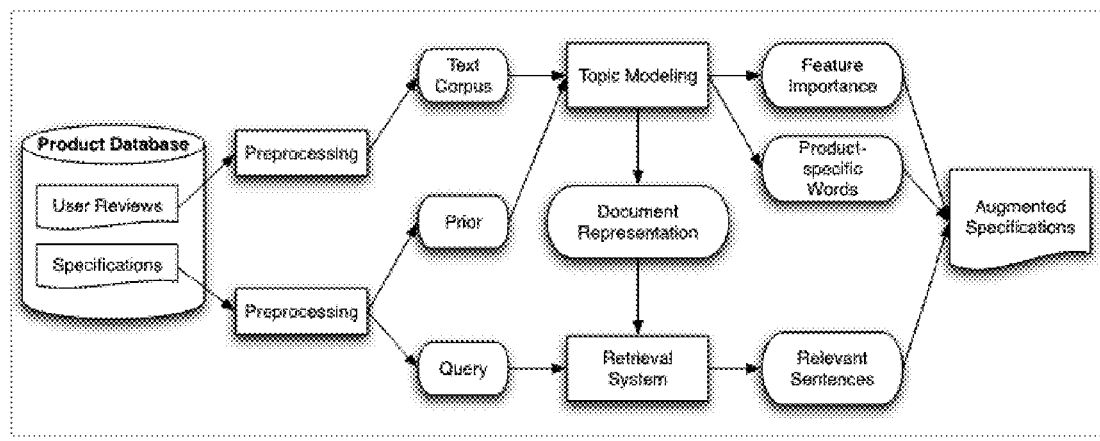
FIG. 7 illustrates a block diagram of an exemplary process of generating augmented product specifications.

FIG. 7 is a block diagram of an exemplary process of the system 500 in operation. From a product database, which contains user reviews added by users and relevant product specifications, certain preprocessing may be performed. For example, the user review data may be preprocessed, and the preprocessed user reviews or product reviews are given to a topic model as a text corpus. The text corpus may be used for topic modeling to create a topic model.

The specifications may also be preprocessed, and the preprocessed specifications are used to obtain prior knowledge ("Prior") for the topic model and to query from a retrieval system. The topic model learns text data with prior knowledge and generates new document representation, which is also given to the retrieval system. The retrieval system retrieves sentences relevant to a query from the new document representation.

At the same time, the topic model may be used to produce feature importance and product specific words based on the text corpus and prior knowledge. The results from the topic model (e.g., the feature importance and the product specific words) and the output of the retrieval system are added to specifications to generate the augmented specifications.

Figure 8:
FIG. 8 illustrates a screen shot of an exemplary presentation of augmented product specifications consistent with the disclosed embodiments.

An exemplary presentation of augmented product specifications is shown in FIG. 8. As shown in FIG. 8, the augmented specifications may include importance information for each feature, words that are specific to the product and relevant sentences for each feature value.

Specifically, in addition to present a column for product feature and a column for corresponding feature value, another column of feature importance may be added to corresponding features. The feature importance column may provide ranking for each feature according to its importance. Further, the product-specific words may also be shown in the presentation. The font and color of the product-specific words may indicate which one is more specific or special to a certain product. For example, among a plurality of words that are specific to the product, the most specific word may have a biggest font and a darkest color.

In addition, if a user put a mouse pointer over a feature value, relevant sentences from reviews are shown to the user. Novice customers may learn about a particular feature value from the retrieved review sentences so that when looking at product specifications, the customers can choose a product with features they want. In one embodiment, the relevant sentences may be presented in a float box. The feature value word may be highlighted in the relevant sentences.

Figure 9:
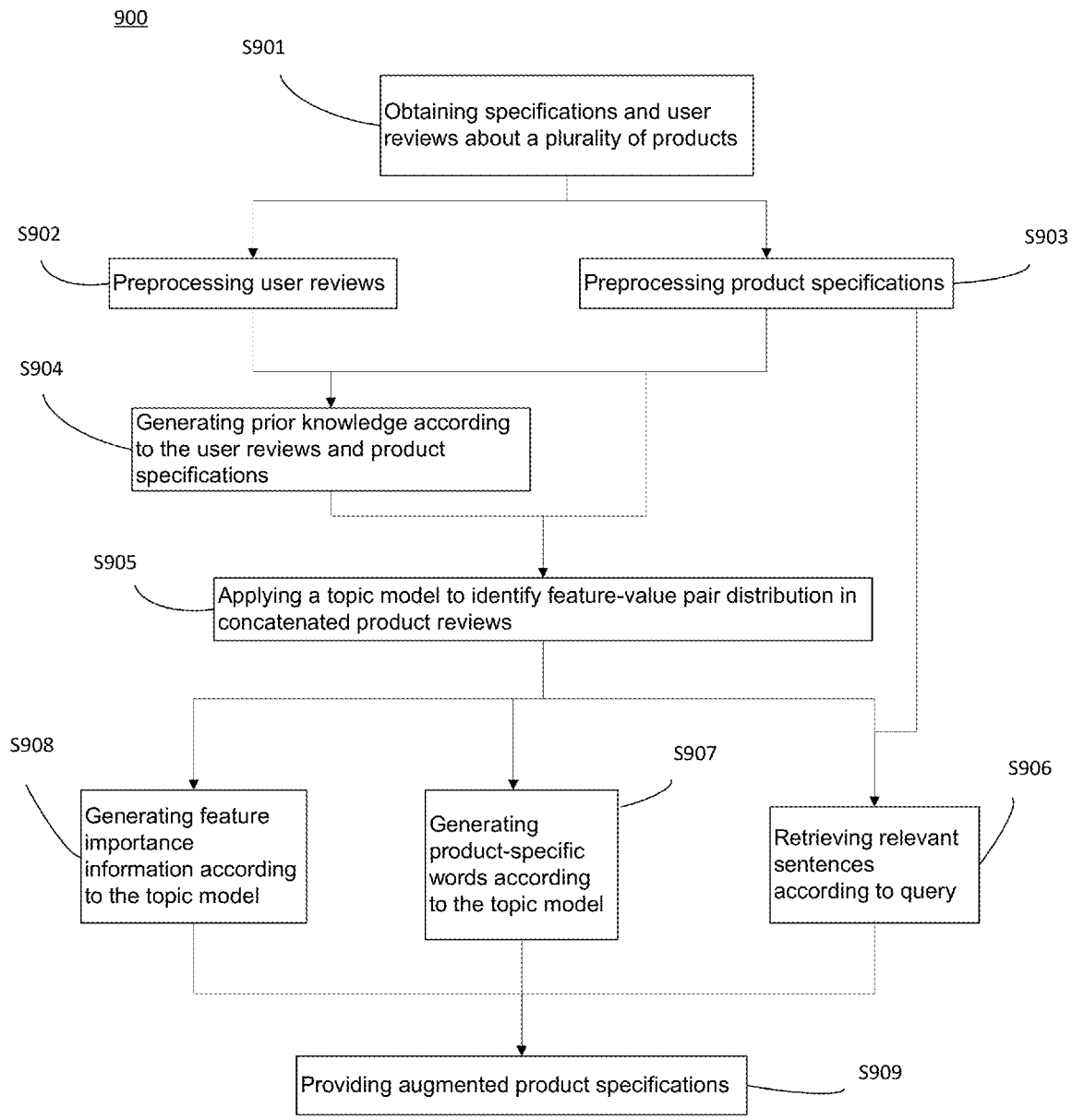
FIG. 9 illustrates a flow chart of an exemplary process for generating augmented product specifications consistent with the disclosed embodiments.

FIG. 9 illustrates a flow chart of an exemplary process 900 for generating augmented product specifications. The process 900 can produce augmented specifications with relevant review sentences retrieved for each feature value and obtain feature importance and product-specific themes so that users can understand the product better. The assumption is that if a consumer reads more texts from other consumers about a feature value, then the consumer may be more familiar with it.

As shown in FIG. 9, specifications and user reviews about a plurality of products are obtained (S901). Specifically, given M products P with reviews R, review sentences T, and specifications S. For each product p, there are specifications $S_p$ and reviews $R_p$ consisting of sentences $T_p$ for each product p. Review data $R_p$ of a product p consist of one or more reviews, and each review contains one or more sentences. Specifications data $S_p$ of a product p is defined as Sp={s|s∈S and s is part of p}, where s is a feature-value pair (f, u), and S is a set of all possible feature-value pairs. In the above example, f is "Image Processor" and u is "DIGIC 5+" for the first row. The process 900 may generate an augmented specifications $S_p$', which augment original specifications Sp by adding sentences $T_{(f,u)}$ that are relevant to (f,u) and assigning importance score of each f. In addition, words that are specific to product p may also be provided.

The process 900 may address the following challenges. First, the vocabulary used in specifications and reviews for a feature or a feature value may be different. For example, a feature value "10,000,000 pixels" of the feature "Effective Sensor Resolution" is not likely to be expressed as it is by users; instead, they may prefer to use "10 MP" or "ten megapixels". If just using the given feature value, many of the relevant review sentences may be missed. Another challenge is that a feature or a feature value word is often used in multiple places of specifications, so the same sentences may be retrieved often for different queries. For example, a feature word "resolution" may be used for features "Sensor Resolution", "Effective Sensor Resolution", "Max Video Resolution", and "Display-Resolution", and these features are actually all different. The retrieval system may need to somehow distinguish the features well. In addition, many of the features and feature-values in specifications may not appear enough in reviews if authors think they are not worth mentioning, and this may result in many false positives.

The review texts are preprocessed (S902) by performing sentence segmentation, word tokenization, and lemmatization using natural language analysis tools such as Stanford CoreNLP. Word tokens are lowered and punctuations are removed. Then, stop words are removed by natural language analysis tools. In certain embodiments, word tokens that appear in less than five reviews are also removed. All reviews of a product are concatenated to form a single product document for topic modeling.

Specifications data is also preprocessed (S903). In one embodiment, feature values that appear in less than five products are removed. Then, each feature and feature value text is split into word tokens by blank, and the word tokens are lowered. The word tokens for a feature and a feature value are processed to generate prior knowledge. The word tokens for a specification are given to a retrieval system as a query to retrieve relevant sentences.

Both preprocessed user reviews data and specifications data may be used in a topic model to identify feature-value pair distribution in concatenated product reviews (S905). A prior knowledge according to user reviews and product specifications (S904) may also be generated and used in the topic model to improve the modeling result.

Specifically, a topic model is a probabilistic model that can find latent themes and their distributions in a document from a text collection, where a theme is a cluster of words whose occurrence in documents overlap frequently. In a topic model, a topic represents correlated words, thus even if a document do not contains a certain word, likelihood of a word w in a document d, p(w|d), can be high enough if d has enough words similar to w. For example, even if "LCD" is not present in a review sentence t, the sentence can have high p("LCD"|t) if the sentence contains related words such as "screen" and "fragile". Therefore, topic models, specifically, topic models based on Latent Dirichlet Allocation (LDA), are employed in the embodiments to bridge vocabulary gap between specifications and reviews.

Figure 10:
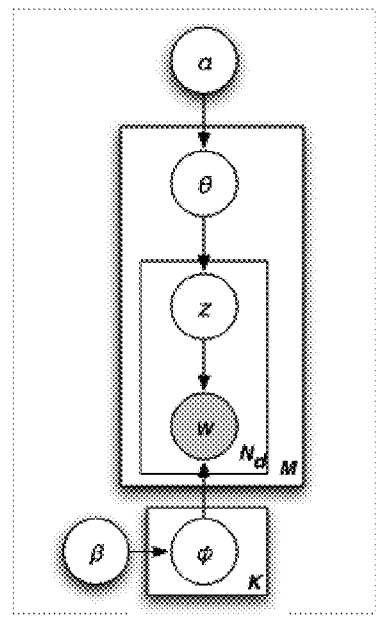
FIG. 10 illustrates a graphical representation of an exemplary Latent Dirichlet Allocation (LDA) model.

The graphical representation of LDA is shown in FIG. 10. As shown in FIG. 10, LDA is a generative topic model, and it finds latent topics, where each topic z is represented by a word distribution $\phi_z$, and their distributions $\theta_d$ in each document d. Given the number of topics K and M documents, where each document d contains $N_d$ words and the whole document collections builds a word vocabulary V, LDA generates each d by drawing $\theta_d = \{p(z|d)\}_{z \in [1,K]}$ and $\phi_z = \{p(w|z)\}_{w \in V}$ form a Dirichlet distribution. In other words, when LDA generates each word in d, it first draws topic mixture $\theta_d$ in d according to Dirichlet distribution Dir($\alpha$), where $\alpha$ is a symmetric prior. Then, it chooses a topic z by the multinomial distribution $\theta_d$. Next, it chooses a word w from the multinomial distribution $\phi_z$, which is drawn according to Dirichlet distribution Dir($\beta$), where $\beta$ is a symmetric prior.

The variables $\theta_d$ and $\phi_z$ are estimated to fit the data as much as possible by approximation methods because exact estimation over all possible topic structure is infeasible. In approximation algorithms, the documents are used as clues where to search among possible topic structures, and two most popular methods are variational methods and collapsed Gibbs sampling. In certain embodiments, collapsed Gibbs sampling method may be employed for its simplicity and comparable performance to variational methods.

In classic LDA, distribution of topics for a document and distribution of words for a topic is not known beforehand. However, clues on those distributions can be applied to improve LDA model. Intuitively, if it is known that a document is about digital camera, the document is likely to have topics regarding "camera" and have words related to "camera". Such prior knowledge can be adapted in order to estimate the model better. This model can be denoted as semi-supervised LDA.

Figure 11:
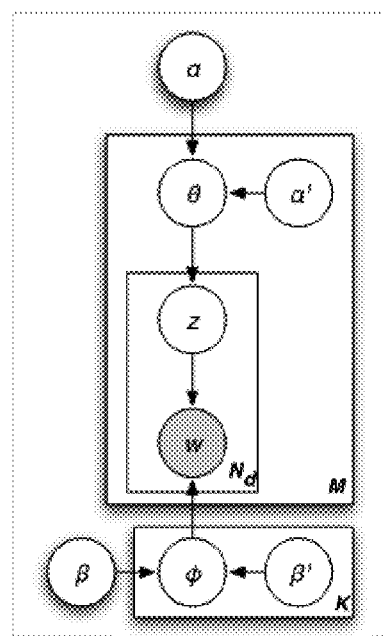
FIG. 11 illustrates a graphical representation of an exemplary semi-supervised LDA model consistent with the disclosed embodiments.

The graphical representation of semi-supervised LDA is depicted in FIG. 11. When an author writes an ith review word $w_{d,i}$ in a document d, the author first chooses a topic $z_{d,i}$ according to the topic distribution in d, $\theta_d$, which is drawn from Dirichlet (K·$\alpha$·$\alpha'_d$), where K is the number of topics, $\alpha$ is a scaling constant, and $\alpha'_d$ is normalized prior probabilities p'(z|$\theta_d$), which is an asymmetric vector. Then, with the chosen topic $z_{d,i}$ the author chooses $w_{d,i}$ according to word distribution for topic z, $\phi_z$, which is drawn from Dirichlet(V·$\beta$·$\beta'_z$), where V is vocabulary size, $\beta$ is a scaling constant, $\beta'_z$ is an asymmetric vector with normalized prior knowledge p'(w|$\phi_z$). The priors $\alpha'$ and $\beta'$ are manually assigned or automatically generated depending on a task. This generative process is repeated for all words in all documents.

Gibbs sampling can be used to learn the model. The topic $z_{d,i}$ is repeatedly sampled based on all the other topic assignments $Z^{\backslash d,i}$ as well as priors. The topic assignment probability is thus defined as:

$$p(z_{d,i} = s | w_{d,i}, Z_{d,i}, \alpha, \alpha'_d, \beta, \beta'_{z_{d,i}}) \propto \quad (1)$$

$$p(w_{d,i} | s, Z_{d,i}, \beta, \beta'_s) p(z_{d,i} = s | Z_{d,i}, \alpha, \alpha'_d) \propto$$

$$\frac{N^{\backslash d,i}_{w_{d,i}|s} + V\beta\beta'_{s,w_{d,i}}}{N^{\backslash d,i}_s + V\beta} \cdot \frac{N^{\backslash d,i}_{s|d} + K\alpha\alpha'_{d,s}}{N_d - 1 + K\alpha}$$

where N is the number of words that satisfies its subscript and superscript conditions, and "\d,i" in subscript or superscript for Z and N are quantities excluding the data at ith position in d. The variables can be estimated using one Gibbs sample after a certain number of iterations. To estimate them more reliably, in certain embodiments, the topic model can take multiple Markov chains from different initializations and take average of them.

While the classic LDA adds the same $\alpha$ to different topics and documents and adds the same $\beta$ to different words and topics, semi-supervised LDA adds $\alpha'$ and $\beta'$ that are specific to the topic and document and the word and topic, respectively, in order to incorporate prior knowledge.

Returning to FIG. 9, the present disclosure provides three embodiments of generating the modified LDA model (S905) according to corresponding prior knowledge (S904). Other embodiments of the disclosure will be apparent to those skilled in the art from consideration of the specification and practice of the invention disclosed herein. The three modified LDA model are based on the semi-supervised LDA, and are denoted as DuanLDA, DuanLDA+ and SpecLDA.

Figure 12:
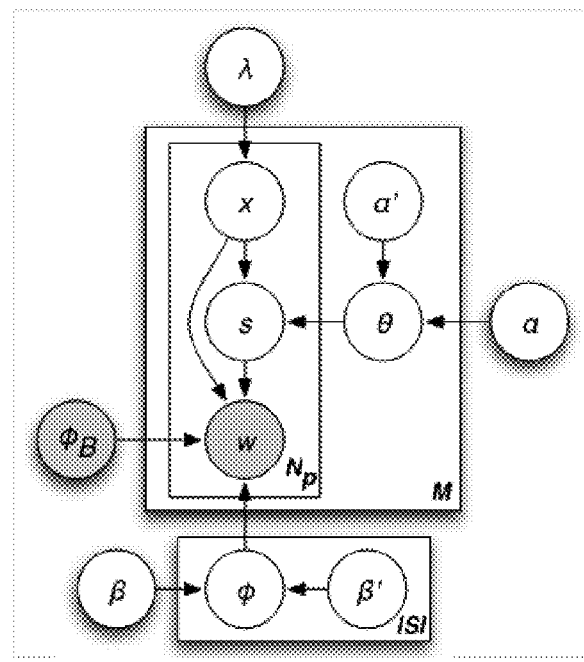
FIG. 12 illustrates a graphical representation of an exemplary DuanLDA model consistent with the disclosed embodiments.

FIG. 12 is a graphical representation of an exemplary DuanLDA model consistent with the present embodiment. In the DuanLDA model, specifications are regarded as topics and concatenated reviews are regarded as documents.

There are M documents, where each document is a concatenated reviews for a product p, and for each document, there are $N_p$ words. s is a specification (a feature-value pair), which is used as a topic, and there are |S| possible specifications. With generated prior knowledge, now the topic (feature-value pair) distribution in p, $\theta_p$, is drawn from Dirichlet (K·$\alpha$·$\alpha'_{p,s}$), where K is the number of topics. The word distribution for feature-value pair s, $\phi_s$, is drawn from Dirichlet(V·$\beta$·$\beta'_{s,w}$), where V is vocabulary size. This generative process is repeated for all words in all product documents.

Specifically, $\beta'_{s,w}$, the prior knowledge for $\phi_s$, is automatically generated from the data by measuring normalized point-wise mutual information (NPMI) between feature words and review words. Then, negatively correlated words are removed, and each word has normalized probability p(w|f), where f is a feature. In addition, Duan LDA may generate prior $\theta$ based on specifications; if a feature-value pair s is not present in a product p, zero is assigned to $\alpha'_{p,s}$, and otherwise, a probability is assigned to $\alpha'_{p,s}$, which is uniform among all present feature-value pairs.

Further, the major difference between DuanLDA and semi-supervised LDA is that DuanLDA uses background language model, which is maximum likelihood estimation of words in the entire data set.

Specifically, when an author writes a review word $w_{p,i}$ for p, the author chooses a background language model or feature topics according to switch $x_{p,i}$ which is determined by a parameter $\lambda$. If the background language model is chosen, $w_{p,i}$ is drawn from the background language model $\phi_B$; otherwise, a specification $s_{p,i}$ is chosen according to $\theta_p$, which is drawn from Dirichlet distribution with $\alpha$ and $\alpha'_p$, and $w_{p,i}$ is drawn from $\phi_s$.

The document model for DuanLDA is defined by:

$$p_{lda}(w | p, \lambda, \hat{\theta}, \hat{\phi}) = \lambda p(w | \phi_B) + (1 - \lambda) \sum_{s=1}^{|S|} p(w | s, \hat{\phi}) p(s | p, \hat{\theta}) \quad (2)$$

The probability of $x_{p,i}$ choosing background language model is determined by $\lambda$ and the background language model, which is $$p(x_{p,i} = 0 | W, \lambda) \propto \lambda p(w_{p,i} | \phi_B) \propto \lambda \frac{N_{w_{p,i}}}{\sum_{w' \in V} N_{w'}} \quad (3)$$

The Gibbs sampling equation to learn $s_{p,i}$ when $x_{p,i}$ being non-background is defined as:

$$p(x_{p,i} = 1, s_{p,i} = z | w_{p,i}, S_{\backslash p,i}, \lambda, \alpha, \alpha'_p, \beta, \beta'_{s_{p,i}}) \propto \quad (4)$$

$$(1 - \lambda) p(w_{p,i} | z, S_{\backslash p,i}, \beta, \beta'_z) p(s_{p,i} = z | S_{\backslash p,i}, \alpha, \alpha'_p) \propto$$

$$(1-\lambda)\frac{N_{w_{p,i}|z}^{\backslash p,i} + V\beta\beta'_{z,w_{p,i}}}{N_z^{\backslash p,i} + V\beta} \frac{N_{z|p}^{\backslash p,i} + K\alpha\alpha'_{p,z}}{N_{x=1|p}^{\backslash p,i} + K\alpha}$$

which basically assigns background topic if $w_{p,i}$ is common enough in the background language model and assigns specification topic $s_{p,i}$ if $w_{p,i}$ is closer to one of the |S| specifications.

Figure 13:
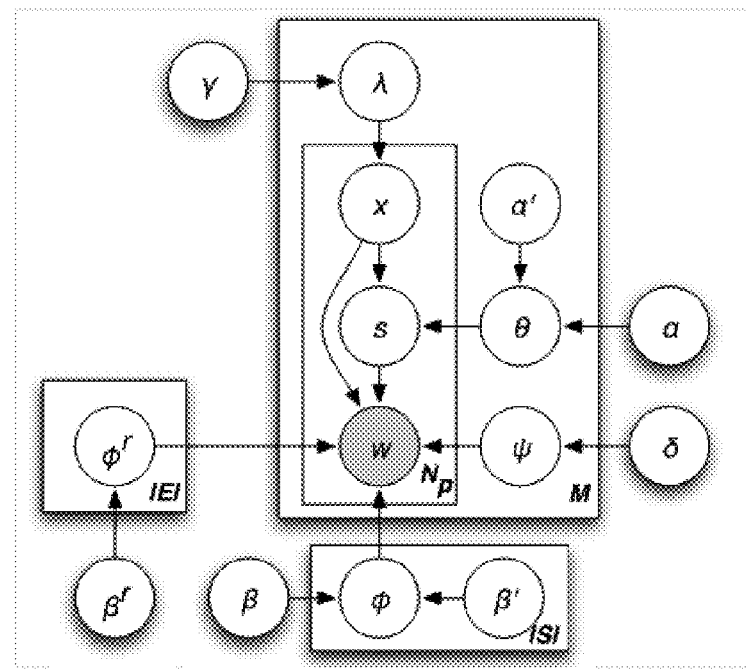
FIG. 13 illustrates a graphical representation of an exemplary DuanLDA+ model consistent with the disclosed embodiments.

FIG. 13 illustrates an exemplary graphical representation of DuanLDA+ model consistent with the present embodiment. DuanLDA has two main problems: (1) it considers only specification topics, and (2) the prior β' is applied regardless of size of each topic. To address these issues, DuanLDA+ model removes background language model and adds product-specific language model for application.

Product reviews may have topics that are not in specifications; for example, value, design, or ease of use is not listed in specifications, but they may be mentioned in reviews. The DuanLDA+ model thus adds |E| review topics to the specification topics, resulting in all topics $\{s_1, \ldots, s_{|S|}, s_{|S|+1}, \ldots, s_{|S|+|E|}\}$. Specification distribution $\theta_p$, which is drawn from Dirichlet distribution with α and $\alpha'_p$, where $\alpha'_{p,s}$ is uniform across all specification and review topics. If the drawn specification $s_{p,i}$ belongs to specifications, it works the same as DuanLDA does. However, if $s_{p,i}$ belongs to review topics (E), the word $w_{p,i}$ is drawn from $\phi^r_s$, which is drawn from Dirichlet distribution with $\beta^r$.

Each specification topic s has its estimated topic size $N_s$. If the topic size $N_s$ is relatively too small or too big compared to size of prior Vβ, the topic s will rely too much or too little on the prior $\beta'_s$. If a topic relies too much on prior, then the topic will just follow the word distribution of prior, and if a topic relies too little on prior, it is likely to bear other themes that are unrelated to prior, where the latter case is more problematic. Therefore, the priors may be regularized according to topic sizes. The DuanLDA+ model introduces prior size controllers $\{\eta_1, \ldots, \eta_{|S|}\}$ each of which repeatedly decays by decay factor ζ if the topic size is too little. More specifically, the Gibbs sampling for word probability in a topic $s_{p,i}=z$ is now defined as:

$$p(w_{p,i}|z, S_{\backslash p,i}, \beta, \beta'_z, \eta_z) \propto \frac{N_{w_{p,i}|z}^{\backslash p,i} + \eta_z V\beta\beta'_{z,w_{p,i}}}{N_z^{\backslash p,i} + \eta_z V\beta} \quad (5)$$

where prior size Vβ is now controlled by $\eta_s$, which is decayed by the equation:

$$\eta_s^{(n+1)} = \begin{cases} \zeta\eta_s^{(n)} & \text{if } pp(s) > \epsilon_{pp} \text{ and } N_s > \epsilon_{is} \\ \eta_s^{(n)} & \text{otherwise} \end{cases} \quad (6)$$

where superscript (n) and (n+1) means the variable at nth and n+1th Gibbs sampling iteration, respectively, and prior proportion of specification s, pp(s) is defined as pp(s)=$\eta_s V\beta$/($N_s+\eta_s V\beta$). The DuanLDA+ model avoids decaying the prior size controller when the topic size is too small in order to prevent the situation that a small topic with a small prior re-grows so that the topic does not rely enough on priors. Therefore, prior size $\eta_s V\beta$, is decreased if the proportion of prior is too much and if there is enough topic size for s.

Further, the background language model in DuanLDA may not be necessary for the data because when preprocessing text data in reviews, stopwords are removed to prevent topics from being occupied by popular words. Thus, the DuanLDA+ model removes background language model, but instead, adds product-specific topics. Some products may have reviews that are very different from those of other products, and the topics may be specific to those products. For application purpose, the DuanLDA+ model adds a product-specific topic $\omega_p$ for each product p in order to capture the product-specific words. When a review author writes a word $w_{p,i}$ for a product p, the author first chooses between product-specific topic and specification topics according to $\lambda_p$, which is drawn from Beta distribution with γ. If the product-specific topic is chosen, $w_{p,i}$ is drawn from $\omega_p$, which is drawn from Dirichlet distribution with δ. The remaining generative process that is not described here is the same as that in DuanLDA.

The resulting document model is thus defined by:

$$p_{lda}(w|p, \lambda, \theta, \phi, \phi^r, \psi) = p(x=0|\lambda_p)p(w|\hat{\psi}_p) + p(x=1|\lambda_p) \left[\sum_{s \in E} p(w|\hat{\phi}^r_s)p(s|\hat{\theta}_p) + \sum_{s \in S_p} p(w|\hat{\phi}_s)p(s|\hat{\theta}_p)\right] \quad (7)$$

and the Gibbs sampling formula for learning when x=0 is given as following:

$$p(x_{p,i}=0|w_{p,i}, X_{\backslash p,i}, \gamma, \delta) \propto \quad (8)$$

$$p(x_{p,i}=0|X_{\backslash p,i}, \gamma)p(w_{p,i}|X_{\backslash p,i}, \delta) \propto \frac{N_{z=0|p}^{\backslash p,i} + \gamma}{N_p - 1 + 2\gamma} \frac{N_{w_{p,i}|x=0}^{\backslash p,i} + \delta}{N_{x=0}^{\backslash p,i} + V\delta}$$

where γ is a small constant. To learn a specification topic s∈S when x=1, the formula with all priors Ω is:

$$p(x_{p,i}=1, s_{p,i}=z|w_{p,i}, X_{\backslash p,i}, S_{\backslash p,i}, E_{\backslash p,i}, \Omega) \propto \quad (9)$$

$$p(x_{p,i}=1|X_{\backslash p,i}, \Omega)p(w_{p,i}|z, S_{\backslash p,i}, \Omega)$$

$$p(s_{p,i}=z|S_{\backslash p,i}, E_{\backslash p,i}, \Omega) \propto$$

$$\frac{N_{z=1|p}^{\backslash p,i} + \gamma}{N_p - 1 + 2\gamma} \frac{N_{w_{p,i}|z}^{\backslash p,i} + V\beta\beta'_{z,w_{p,i}}}{N_z^{\backslash p,i} + V\beta} \frac{N_{z|p}^{\backslash p,i} + |S|\alpha\alpha'_{p,z}}{N_{x=1|p}^{\backslash p,i} + K\alpha}$$

where K is the number of all topics (|S|+|E|). Similarly, learning a review topic s∈E when x=1 is done with the following Gibbs sampling formula:

$$p(x_{p,i}=1, s_{p,i}=z|W, X_{\backslash p,i}, S_{\backslash p,i}, E_{\backslash p,i}, \Omega) \propto \quad (10)$$

$$p(x_{p,i}=1|X_{\backslash p,i}, \Omega)p(w_{p,i}|z, W_{\backslash p,i}, E_{\backslash p,i}, \Omega)$$

$$p(s_{p,i}=z|S_{\backslash p,i}, E_{\backslash p,i}, \Omega) \propto \frac{N_{x=1|p}^{\backslash p,i} + \gamma}{N_p - 1 + 2\gamma} \frac{N_{w_{p,i}|z}^{\backslash p,i} + \beta^r}{N_z^{\backslash p,i} + V\beta^r} \frac{N_{z|p}^{\backslash p,i} + \alpha}{N_{x=1|p}^{\backslash p,i} + K\alpha}$$

Prior distribution of β based on mutual information is quite even since there are many words that are "somewhat" related words to a feature. Since probabilities of those "somewhat" related words add up to lower the probability of high ranked words, p(w|f), it is hard for the topic f to be chosen even for the words that are very related to f and high ranked in $\beta'_f$. Thus, the DuanLDA+ model assumes the prior follows Zipf's law distribution and adjusts p(w|f) according to it. Specifically, from the priors obtained for DuanLDA, p(w|f), new prior p'(w|f) for each word w is defined as:

$$p'(w|f) = \begin{cases} \frac{p(w|f)}{\sum_{w \in v(f)} p(w|f)} \sum_{i=1}^{|v(f) \cap V|} Zipf(i) & \text{if } w \in v(f) \\ Zipf(\text{rank}_f(w)) & \text{otherwise} \end{cases} \quad (11)$$

where v(f) is a vocabulary in f, V is a vocabulary in all reviews, $\text{rank}_f(w)$, is w's rank in p(w|f) excluding words in v(f), and Zipf's law distribution function Zipf(i) is defined as $$Zipf(i) = \frac{1/i^s}{\sum_{n=1}^{|V|} 1/n^s} \quad (12)$$

where s is a parameter characterizing the distribution. Basically, p'(w|f) keeps the rankings in p(w|f) but discards probabilities of words that are not feature words. The feature words take the sum of first n probabilities of Zipf's law distribution, where n is the intersection of feature word vocabulary and all reviews vocabulary, and the sum is redistributed to the feature words following their proportions in p(w|f). Non-feature words keep only their ranks excluding feature-words, and new prior probabilities follow Zipf's law distribution with corresponding ranks plus v(f). By doing this, the DuanLDA+ model can discriminate important words from unimportant words more explicitly so that the topics are not occupied by unimportant prior words.

Figure 14:
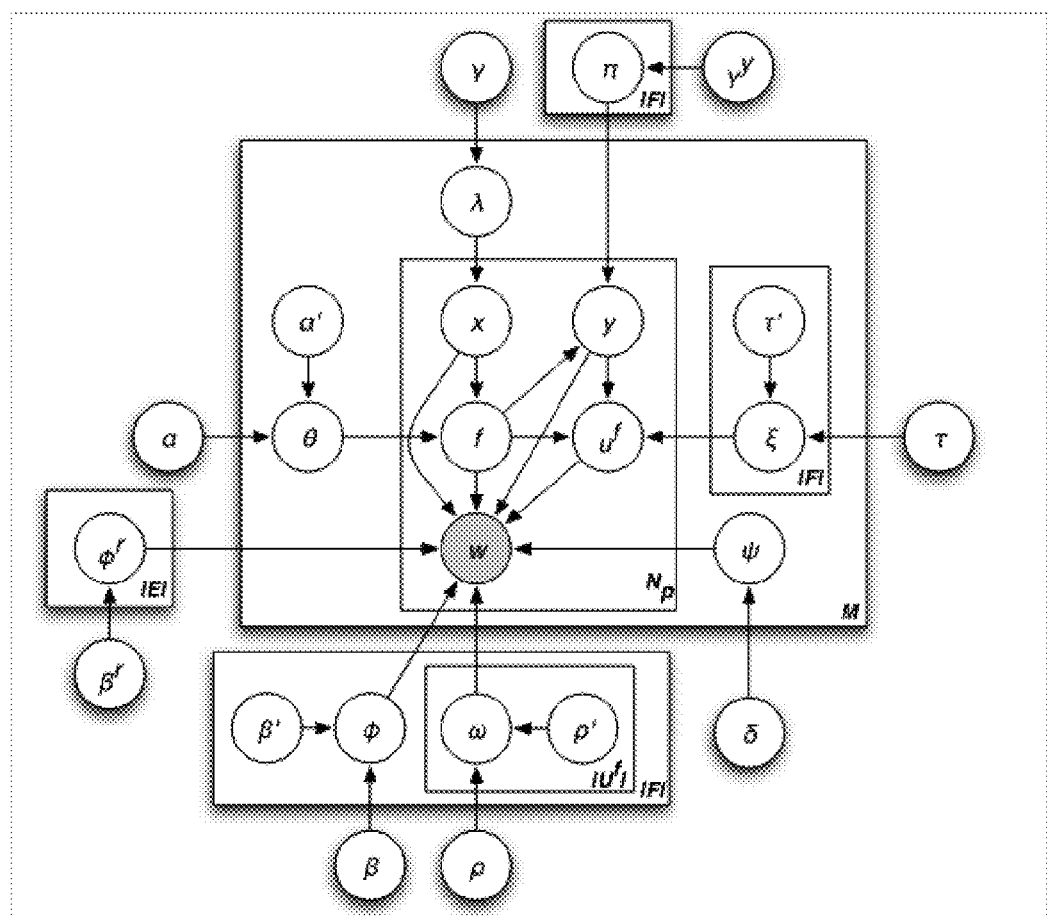
FIG. 14 illustrates a graphical representation of an exemplary SpecLDA model consistent with the disclosed embodiments.

FIG. 14 illustrates an exemplary graphical representation of SpecLDA model consistent with the present embodiment. The remaining problem with DuanLDA+ is that it does not fully take advantage of the specifications structure. In DuanLDA and DuanLDA+, each of the feature-value pairs is regarded as one independent specification. If there are not enough sentences for a feature-value pair in the data, the estimated feature-value topic will be over-fitted. However, most features have more than one value, meaning that features are overlapped among feature-value pairs with the same feature. Thus, SpecLDA separates feature topics from value topics to merge the overlapped features. In addition, DuanLDA and DuanLDA+ import priors only from feature words whereas feature value words may be more important than feature words. For example, for a feature-value pair ("Optical Sensor Type", "CMOS"), people might like to use the word "CMOS" when they mention the feature-value pair. However, the word "CMOS" may not be ranked high in DuanLDA's feature prior for "Optical Sensor Type", since the feature also has several other values. Therefore, the SpecLDA model uses separate priors for features and values.

In the SpecLDA model, for each feature f of |F| features, there are $|U^f|$ possible values. To separate a feature from feature values, a feature variable f is separated from the value variable $u^f$, which is a possible value for f. Also, the feature value topics w is introduced to separate them from feature topics $\phi$.

In this model, when an author writes a review word $w_{p,i}$ of a product p, the author first chooses if the word is about product features or product-specific topic using switch $x_{p,i}$ according to $\lambda_p$, which is drawn from beta distribution with symmetric vector $\gamma$. If a product-specific topic is chosen, a word is drawn following $\omega_p$, which is drawn from Dirichlet distribution with symmetric vector $\delta$. If product features are chosen by $x_{p,i}$, the author chooses a feature $f_{p,i}$ from possible feature set $\{f_1, \ldots, f_{|F|}, f_{|F|+1}, \ldots, f_{|F|+|E|}\}$, where $\{f_1, \ldots, f_{|F|}\}$ is a feature set from specifications and $\{f_{|F|+1}, \ldots, f_{|F|+|E|}\}$ are features that are not in specifications but are found in reviews, according to $\theta_p$, which is drawn from Dirichlet distribution with $\alpha$ and asymmetric prior $\alpha'_p$. If $f_{p,i}$ belongs to review features, $w_{p,i}$ is drawn from multinomial distribution $\phi^r_p$ which is drawn from Dirichlet distribution with symmetric vector $\beta^r$. If the chosen feature $f_{p,i}$ belongs to specifications features, the author again chooses to write a feature word or a feature value word about $f_{p,i}$ using switch $y_{p,i}$ according to $\pi_f$, which is drawn from beta distribution with symmetric vector $\gamma^v$. If the author chooses to write a feature word for $f_{p,i}$, the $w_{p,i}$ is chosen according to $\phi_f$, which is drawn from Dirichlet distribution with a constant $\beta$ and asymmetric prior $\beta'$. Otherwise, if the author further chooses value $u_f$ of the feature $f_{p,i}$ according to $\xi_{p,f}$, which is drawn from Dirichlet distribution with a constant $\tau$ and asymmetric prior $\tau_{p,f}$. With the chosen feature value $u_f$, the author chooses a word according to $\omega_{f,u}$, which is drawn from Dirichlet distribution with a constant $\rho$ and asymmetric prior $\rho'_{f,u}$. This process is repeated for all review words of all products.

The generative process can be described in the following algorithm:

```
for each feature f do
    draw π_f ~ Beta(γ^u)
    draw φ_f ~ Dir(W · β · β')
    for each value u^f of f do
        draw ω_{f,uf} ~ Dir(W · ρ · ρ'_{f,uf})
    end for
end for
for each review topic e do
    draw φ_e^r ~ Dir (β^r)
end for
for each product p do
    draw λ_p ~ Beta(γ)
    draw θ_p ~ Dir(K · α · α'_p)
    draw ψ_p ~ Dir(δ)
    for each feature f do
        draw ξ_{p,f} ~ Dir(V^f · τ · τ'_{pf})
    end for
    for each i ∈ {1,...,N_p} do
        draw x_{p,i} Bernoulli(λ_p)
        if x_{p,i} = 0 then
            draw w_{p,i} ~ Multi(ψ_p)
        else
            draw f_{p,i} ~ Multi(θ_p)
            if f_{p,i} ∈ {f_{|F|+1},...,f_{|F|+|E|}} then
                draw w_{p,i} _ Multi(φf_{p,i}^r)
            else
                draw y_{p,i} ~ Bernoulli(πf_{p,i})
                if y_{p,i} ~ 0 then
                    draw w_{p,i} ~ Multi(φf_{p,i})
                else
                    draw u_{p,i}^f ~ Multi(ξp,f_{p,i})
                    draw w_{p,i} ~ Multi(w_{fp,i,up,i}^f)
                end if
            end if
        end if
    end for
end for
```

The document model of SpecLDA is thus:

$$p_{lda}(w \mid p, \hat{\lambda}, \hat{pi}, \hat{\theta}, \hat{\xi}, \hat{\phi}, \hat{\phi}^r, \hat{\omega}, \hat{\psi}) = \qquad (13)$$
$$p(x=0 \mid \hat{\lambda}_p)p(w \mid \hat{\psi}_p) + p(x=1 \mid \hat{\lambda}_p)\Bigg[\sum_{f \in E} p(w \mid \hat{\phi}^r{}_f)p(f \mid \hat{\theta}_p) +$$
$$\sum_{f \in E_p} p(f \mid \hat{\theta}_p)p(w \mid f, \hat{\pi}, \hat{\phi}, \hat{\xi}, \hat{\omega},)\Bigg] \text{where}$$

$$p(w \mid f, \hat{\pi}, \hat{\phi}, \hat{\xi}, \hat{\omega},) = \qquad (14)$$
$$p(y=0 \mid \hat{\pi}_f)p(w \mid \hat{\phi}_f) + p(y=1 \mid \hat{\pi}_j)\sum_{u \in U_f} p(u \mid \hat{\xi}_f)p(w \mid \hat{\omega}_{f,u})$$

and the Gibbs sampling formula for learning when product-specific topic is used (x=0) is the same as in formula (8).

When learning a review topic or a specification feature topic f, the formula is defined as:

$$p(x_{p,i}=1, f_{p,i}=z, y_{p,i}=0 \mid w_{p,i}, X_{\backslash p,i}, F_{\backslash p,i}, E_{\backslash p,i}, Y_{\backslash p,i}, \Omega)$$

$$\propto p(x_{p,i}=1 \mid X_{\backslash p,i}, \Omega) p(f_{p,s}=z \mid F_{\backslash p,i}, E_{\backslash p,i}, \Omega)$$

$$p(y_{p,i}=0 \mid z, Y_{\backslash p,i}, F_{\backslash p,i}, E_{\backslash p,i}, \Omega) p(w_{p,i} \mid z, F_{\backslash p,i}, E_{\backslash p,i}, Y_{\backslash p,i}, \Omega) \qquad (15)$$

where $p(x_{p,i}=1 \mid X_{\backslash p,i}, \Omega)$ is defined in formula (9), and the remaining terms are defined as:

$$p(f_{p,i}=z \mid F_{\backslash p,i}, E_{\backslash p,i}, \Omega) = \begin{cases} \dfrac{N_{z|p}^{\backslash p,i} + |F|\alpha\alpha'_{p,z}}{N_{x=1|p}^{\backslash p,i} + K\alpha} & \text{if } z \in F \\ \dfrac{N_{z|p}^{\backslash p,i} + \alpha}{N_{x=1|p}^{\backslash p,i} + K\alpha} & \text{if } z \in E \end{cases} \qquad (16)$$

$$p(y_{p,i}=0 \mid z, Y_{\backslash p,i}, F_{\backslash p,i}, E_{\backslash p,i}, \Omega) = \begin{cases} \dfrac{N_{y=0|z}^{\backslash p,i} + \gamma^y}{N_z^{\backslash p,i} + 2\gamma^y} & \text{if } z \in F \\ 1 & \text{if } z \in E \end{cases} \qquad (17)$$

$$p(w_{p,i} \mid z, F_{\backslash p,i}, E_{\backslash p,i}, Y_{\backslash p,i}, \Omega) = \begin{cases} \dfrac{N_{w_{p,i}|z,y=0}^{\backslash p,i} + V\beta\beta'_{z,w_{p,i}}}{N_{z,y=0}^{\backslash p,i} + V\beta} & \text{if } z \in F \\ \dfrac{N_{w_{p,i}|z,y=0}^{\backslash p,i} + \beta^r}{N_{z,y=0}^{\backslash p,i} + V\beta^r} & \text{if } z \in E \end{cases} \qquad (18)$$

where K is the number of all reviews and specifications topics.

The SpecLDA also learns when a feature is chosen ($f_{p,i}=z$) and feature value is chosen ($u_{p,i}=j$) to describe the feature, which is defined as:

$$p(x_{p,i}=1, f_{p,i}=z, y=1, u_{p,i}=j$$

$$\mid w_{p,i}, X_{\backslash p,i}, F_{\backslash p,i}, Y_{\backslash p,i}, U_{\backslash p,i}, \Omega)$$

$$\propto p(x_{p,i}=1 \mid X_{\backslash p,i}, \Omega)$$

$$p(f_{p,i}=z \mid F_{\backslash p,i}, E_{\backslash p,i}, \Omega)$$

$$p(y_{p,i}=1 \mid z, Y_{\backslash p,i}, F_{\backslash p,i}, E_{\backslash p,i}, \Omega)$$

$$p(u_{p,i}=1 \mid z, Y_{\backslash p,i}, F_{\backslash p,i}, U_{\backslash p,i}, \Omega)$$

$$p(w_{p,i} \mid z, j, U_{\backslash p,i}, \Omega) \qquad (19)$$

where first and the second terms are defined before, and the remaining terms are defined as:

$$p(y_{p,i}=1 \mid z, Y_{\backslash p,i}, F_{\backslash p,i}, E_{\backslash p,i}, \Omega) = \frac{N_{y=1|z}^{\backslash p,i} + \gamma^y}{N_z^{\backslash p,i} + 2\gamma^y} \qquad (20)$$

$$p(u_{p,i}=j \mid z, Y_{\backslash p,i}, F_{\backslash p,i}, U_{\backslash p,i}, \Omega) = \frac{N_{j|p}^{\backslash p,i} + |U^f|\tau\tau'_{p,z}}{N_{z,y=1|p}^{\backslash p,i} + |U^f|\tau} \qquad (21)$$

$$p(w_{p,i} \mid z, j, U_{\backslash p,i}, \Omega) = \frac{N_{w_{p,i}|j}^{\backslash p,i} + V\rho\rho'_{z,j,w_{p,i}}}{N_j^{\backslash p,i} + V\rho} \qquad (22)$$

where $|U^f|$ is the number of all possible feature values for the feature f. Regularization is applied for both features word and feature value words as in DuanLDA+.

Returning to FIG. 9, the generated topic model may then be used to provide augmented specifications. An ad-hoc language model retrieval system based on the generated topic model may retrieve relevant review sentences according to a query (S906). The query may be a feature-value pair of a product obtained from the preprocessing of product specifications.

Specifically, in order to retrieve relevant documents from a document collection, a query likelihood retrieval model may be employed:

$$p(d \mid q) \propto p(q \mid d) \cdot p(d)$$

$$\propto p(q \mid d) \qquad (23)$$

where d is a document and q is a query, which is a list of words. p(d|q) is the probability that d satisfies information needs of a user given q. p(q|d) measures the proximity of d to q, and p(d) is a general preference on d, which is query-independent. Thus, the formula assigns high scores to documents if they match query well and are preferred by users. In the disclosed embodiments, the assumption is that document preferences are not given. So q is uniform and the term p(d) is dropped.

In general, p(q|d) is defined as:

$$p(q \mid d) = \prod_{w \in q} p(w \mid d) \qquad (24)$$
$$= \prod_{w \in V} p(w \mid d)^{c(w,q)}$$

where w is a word in q, V is a vocabulary set of the document collection, and c(w,q) is a count of w in q. p(w|d) is a unigram language model that is estimated by maximum likelihood estimation, and it means a word w's likelihood in a document d. Thus, p(q|d), likelihood of a query q in a document d, becomes higher if more words in q appear more in d.

To avoid overfitting and prevent p(q|d) from being zero when one of a query word is not in d, smoothed p(w|d) is used in general. Specifically, Jelinek-Mercer smoothing method is used, p(w|d) is defined as:

$$p(w \mid d) = (1-\lambda)p_{ml}(w \mid d) + \lambda p(w \mid B) \qquad (25)$$

where $p_{ml}(w \mid d)$ is a document language model estimated with maximum likelihood, and p(w|B) is a collection language model. To smooth $p_{ml}(w \mid d)$, a reference language model p(w|B) is used, where an entire corpus is used as B so that a general word likelihood can augment $p_{ml}(w \mid d)$. The resulting p(w|d) is thus weighted average of $p_{ml}(w \mid d)$ and p(w|B). In formula (24), underflow may happen by multiplying small values several times. To avoid it, a logarithm is taken, and standard language model retrieval approach is followed. The resulting score of d for q is defined as $$\text{score}(q, d) = \log p(q \mid d) = \sum_{w \in V} c(w, q) \log p(w \mid d) \quad (26)$$

$$= \sum_{w \in V} c(w, q) \log[(1 - \lambda) p_{ml}(w \mid d) + \lambda p(w \mid B)] \quad (27)$$

$$\propto \sum_{w \in V} c(w, q) \log\left[1 + \frac{(1 - \lambda) p_{ml}(w \mid d)}{\lambda p(w \mid B)}\right] \quad (28)$$

where formula (27) and (28) are equivalent if $\alpha_q = \Sigma_{w \in V} c(w, q) \log \lambda p(w|B)$ is added to formula (28). But $\alpha_q$ is omitted since it does not depend on d, which means that it does not affect ranking of documents. By rewriting the formula (27) to (28), it now can penalize a score for a common query word, which is a desired property in ad-hoc information retrieval.

The present embodiments may apply the query likelihood retrieval method with proper adjustment. In the present problem setting, a query q is words in a query specification $s_q = (f_q, u_q)$, and d is a sentence t in all review sentences T. V is thus vocabulary in T, and B is a unigram language model of T. Since the text unit is now a sentence, which usually contains much less words than a document so that the statistical evidence between a query and a sentence is much weaker, the problem is harder than document retrieval. Fortunately, the method takes advantage of specifications to filter out some of unrelated sentences; if a sentence $t^p$ is from a product p's review sentences $T^p$ and query specification $s_q$ is not in p's specifications $S_p$, $t^p$ can be ignored. Thus, the relevance score of sentence t for q is defined as $$\text{score}(q, t^p) = \begin{cases} 0, & \text{if } s_q \notin S_p \\ \sum_{w \in V} c(w, s_q) \log\left[1 + \frac{(1 - \lambda) p_{ml}(w \mid t^p)}{\lambda p(w \mid B)}\right], & o/w \end{cases} \quad (29)$$

where o/w means "otherwise" and $p_{ml}(w|t^p)$ can be estimated in the same way as p(w|d) in equation (25). This formula (29) will be used as a baseline method and referred as QL.

However, for the baseline method, it may not perform well if a vocabulary used in a query is different from a vocabulary used in documents to describe the query. For example, for a query feature-value pair ("Display Type", "3 in LCD Display"), QL will assign zero score to the sentence "Screen is big but fragile for active lifestyle" since query words are not in the sentence, resulting in $p_{ml}(w|t^p)$ being always zero, though the sentence is actually relevant to the feature. Therefore, in order to bridge the vocabulary gap between specifications and reviews, $p_{ml}(w|t^p)$ is replaced with $p'(w|t^p)$ using topic model.

In addition, the present embodiments incorporate ad-hoc retrieval with the modified LDA model. Relying solely on LDA document model is not a good idea since it loses original query information, so interpolation with original language model has been suggested. Thus, the method uses a weighted interpolation model with the modified LDA document model and maximum likelihood estimated language model.

Further, the goal of the retrieval system is to retrieve relevant sentences, not documents. If extending topic models with sentence unit, it may require too many variables are required since the number of sentences is usually way greater than the number of documents. Thus, the present embodiments do not use sentence unit in LDA, but converts estimations from document-level to sentence-level. Language model $p'(w|t^p)$ for a sentence t in a document d is thus defined as:

$$p'(w|t^p) = \lambda' p_{ml}(w|t^p) + (1-\lambda') p_{lda} \quad (30)$$

Therefore, incorporating topic model and maximum likelihood estimated language model, the relevance score of sentence t for q used in the present embodiments is defined as:

$$\text{score}(q, t^p) = \begin{cases} 0, & \text{if } s_q \notin S_p \\ \sum_{w \in V} c(w, s_q) \log\left[1 + \frac{(1 - \lambda) p'(w \mid t^p)}{\lambda p(w \mid B)}\right], & o/w \end{cases} \quad (31)$$

where $p'(w|t^p)$ is computed from one of the modified LDA models described previously and maximum likelihood estimated language model. Here, $p'(w|t^p)$ is obtained from equation (30) in order to give scores to sentences.

Customers may want to know what is special for a certain product compared to others. Product specific topics can be obtained in DuanLDA+ and SpecLDA (S907). For each product p, $\omega_p$ contains a product-specific topic. The high ranked words in $\omega_p$ mean that they are likely to be closer to the product-specifics than any other topics. Thus, those high-ranked words may suggest which words are specially used for a certain product.

The importance of a feature may be also useful for a novice customer who is not familiar with features of a product. Feature importance information may be generated according to the modified LDA models (S908). In DuanLDA and DuanLDA+, features are overlapped in multiple feature-value pairs, and the feature importance of a feature f can be calculated from the Gibbs sample after learning, which is defined as $$p(f) = \frac{\sum_{z \in f} N_{s=z}}{N_{x=1}} \sum_{z \in f} \quad (32)$$

and since features are separated from values in SpecLDA, feature importance is defined as $$p(f) = \frac{N_f}{N_{x=1}} \quad (33)$$

The higher p(f) means that the feature f is mentioned more in the reviews.

The relevant sentences, feature importance information and product-specific words may then be provided as augmented specifications (S909) of the products obtained in the first step (S901). The augmented specifications may help users to better understand the feature value of the product.

The present disclosure provides a system and method for generating augmented product specifications based on user reviews. The augmented product specifications may enhance product purchase experience. The system employs new approaches based on modified LDA topic models to learn topic distribution in document and word distribution in topic. The generated topic model may be used to retrieve relevant review sentences corresponding to a product feature-value pair. The generated topic model may also be used to rank feature importance and provide product-specific words. Comparing to existing technologies, the present disclosure may enhance product purchase experience by providing additional informative explanations of product specifications.

A product specification is often available for a product on E-commerce websites. However, novice customers often do not have enough knowledge to understand all features of a product especially advanced features. In order to provide useful knowledge to the customers, the present disclosure provides a system that automatically analyzes product specifications with product reviews, which are abundant on the web nowadays. Specifically, the discloses embodiments provides novel LDA models that can provide useful knowledge such as feature importance and product-specific themes as well as retrieving review texts relevant to a specification to inform customers what other customers have said about the specification in reviews of the same product and also different products.

It is understood that the disclosed system and method for generating augmented specifications is not limited to product purchasing scenario. The disclosed system and method can also be used for any text collections with specification (key-value) type prior knowledge.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for providing augmented product specifications based on user reviews, comprising:
    obtaining input data of specifications and user reviews on a plurality of products, each product corresponding to a plurality of specifications and a plurality of user reviews, each specification including at least a pair of a feature and a feature-value of the product;
    concatenating the user reviews of the products to form product-documents, each product-document corresponding to the concatenated user reviews of a product;
    employing a topic model to process the input data and learn topic distributions in the product-documents and word distributions in topics, the topics including specifications of the products, the topic model being a type of statistical model for discovering topics that occur in a collection of product-documents, each product-document containing one or more topics, and each topic existing in one or more documents, the topics including specification-topics and review-topics, comprising:
        obtaining prior knowledge including known topic distributions in the product-documents and known word distributions in the topics, and obtaining a type of each word, wherein
            the type of the word identifies whether the word is a product-specific word or a specification word, and
            the prior knowledge of known topic distributions in the product-documents further includes known specification-topic distributions in the product-documents and known review-topic distribution in the product-documents separately;
        incorporating the prior knowledge and employing the topic model to process the input data and learn the topic distributions in the product-documents and the word distributions in the topics; and
        obtaining an outcome from the topic model, the outcome including learned topic distributions in the product-documents and learned word distributions in the topics; and
    providing augmented specifications to a user based on the topic model, the augmented specifications including one or more of relevant sentences of the feature-value, feature importance information, and product-specific words of the product, wherein providing augmented specifications based on the topic model further comprises:
        when the user hovers a cursor on a product feature-value, displaying the relevant sentences in a float box according to a position of the cursor;
        ranking and displaying the feature importance information in a separate column corresponding to the product features; and
        displaying the product-specific words in a separate row, wherein the font size and color of the word corresponds to how specific the word is to the product; and
    wherein, provided that, the prior knowledge about a distribution of a specific word w in a feature topic f is denoted as $p(w|f)$,
        the known word distributions in the feature-topics follows Zipf's law distribution;
        a new prior $p'(w|f)$ for each word w is defined as:

$$p'(w|f) = \begin{cases} \frac{p(w|f)}{\sum_{w \in v(f)} p(w|f)} \sum_{i=1}^{|v(f) \cap V|} Zipf(i) & \text{if } w \in v(f) \\ Zipf(\text{rank}_f(w)) & \text{otherwise} \end{cases}$$

wherein $v(f)$ is a vocabulary in f, V is a vocabulary in all reviews, $\text{rank}_f(w)$ is w's rank in $p(w|f)$ excluding words in $v(f)$, and Zipf's law distribution function $Zipf(i)$ is defined as $$Zipf(i) = \frac{1/i^s}{\sum_{n=1}^{|V|} 1/n^s}$$

wherein s is a parameter characterizing the distribution.

2. The method according to claim 1, wherein
    the topic model is a Latent Dirichlet Allocation (LDA) model;
    the topic distributions in the product-documents follow a Dirichlet distribution; and
    the word distributions in the topics follow a Dirichlet distribution.

3. The method according to claim 1, wherein obtaining the prior knowledge further comprises:
    obtaining a type of each specification word, wherein the type of the specification word identifies whether the word is a feature word or a feature-value word.

4. The method according to claim 3, wherein employing the topic model further comprises:
    separating the specification-topics into feature-topics and feature-value-topics;
    obtaining the prior knowledge of known specification-topic distributions in the product-documents further including obtaining known feature-topic distributions in the product-documents and known feature-value-topic distributions in the product-documents separately; and incorporating the prior knowledge and employing the topic model to process the input data and learn the feature-topic distributions in the product-documents, the feature-value-topic distributions in the product-documents, the review-topic distributions in the product-documents and the word distributions in the topics.

5. The method according to claim 4, wherein:

provided that M products P with reviews R, review sentences T, and specifications S are analyzed, the words w contained in each document p is $N_p$, topic distribution in document is denoted as θ and word distribution in topic is denoted as ϕ, f denotes a product feature, u denotes a feature-value, obtaining the prior knowledge, wherein:

a feature variable f is separated from the feature-value variable u′, which is a possible value for f; and the feature-value-topics ω is introduced to separate the feature-value-topics from feature-topics ϕ;

when an author writes a review word $w_{p,i}$ of a product p, the author first chooses if the word is about product features or product-specific topic using switch $x_{p,i}$ according to $λ_p$, which is drawn from beta distribution with symmetric vector γ;

when product features are chosen by $x_{p,i}$, the author chooses a feature $f_{p,i}$ from possible feature set $\{f_1, \ldots, f_{|F|}, f_{|F|+1}, \ldots, f_{|F|+|E|}\}$, where $\{f_1, \ldots, f_{|F|}\}$ is a feature set from specifications and $\{f_{|F|+1}, \ldots, f_{|F|+|E|}\}$ are features that are not in specifications but are found in reviews, according to $θ_p$, which is drawn from Dirichlet distribution with α and asymmetric prior $α'_p$;

when the chosen feature $f_{p,i}$ belongs to specifications features, the author again chooses to write a feature word or a feature value word about $f_{p,i}$ using switch $y_{p,i}$ according to $π_f$, which is drawn from beta distribution with symmetric vector $γ^y$;

when the author further chooses value $u_f$ of the feature $f_{p,i}$ according to $ξ_{p,f}$, which is drawn from Dirichlet distribution with a constant τ and asymmetric prior $τ_{p,f}$; with the chosen feature value $u_f$, the author chooses a word according to $ω_{f,u}$, which is drawn from Dirichlet distribution with a constant ρ and asymmetric prior $ρ'_{f,u}$; and regularization is applied for priors of both features word and feature value words;

employing Gibbs Sampling to estimate the topic model based on the prior knowledge, wherein the topic model is $$p_{lda}(w \mid p, \hat{λ}, \hat{pi}, \hat{θ}, \hat{ξ}, \hat{ϕ}, \hat{ϕ}^r, \hat{ω}, \hat{ψ}) =$$
$$p(x=0 \mid \hat{λ}_p)p(w \mid \hat{ψ}_p) + p(x=1 \mid \hat{λ}_p)\left[\sum_{f \in E} p(w \mid \hat{ϕ}^r_f)p(f \mid \hat{θ}_p) + \sum_{f \in E_p} p(f \mid \hat{θ}_p)p(w \mid f, \hat{π}, \hat{ϕ}, \hat{ξ}, \hat{ω},)\right]$$

wherein $$p(w \mid f, \hat{π}, \hat{ϕ}, \hat{ξ}, \hat{ω},) =$$
$$p(y=0 \mid \hat{π}_f)p(w \mid \hat{ϕ}_f) + p(y=1 \mid \hat{π}_f)\sum_{u \in U_f} p(u \mid \hat{ξ}_f)p(w \mid \hat{ω}_{f,u}).$$

6. The method according to claim 1, wherein obtaining prior knowledge further comprises:

introducing prior size controllers to regularize priors according to the size of the topics, the priors being the word distributions in topics obtained from the prior knowledge.

7. The method according to claim 1, wherein providing augmented specifications based on the topic model further comprises:

applying an ad-hoc retrieval system to generate relevant sentences for a query, the query being a feature-value pair of a product, wherein:

the ad-hoc retrial system evaluates the relevance of sentences in the user reviews by combining the query information and the outcome from the topic model.

8. The method according to claim 1, wherein providing augmented specifications based on the topic model further comprises:

providing that f denotes a product feature, $N_i$ denotes number of words in document i, s denotes a specification, z denotes a topic, when feature-value pairs are not separated when generating the prior knowledge, after obtaining the outcome from the topic model, defining the importance of a feature as $$p(f) = \frac{\sum_{z \in f} N_{s=z}}{N_{x=1}}$$

when features and feature-values are separated when generating the prior knowledge, after obtaining the outcome from the topic model, defining the importance of a feature as $$p(f) = \frac{N_f}{N_{x=1}}.$$

9. A non-transitory computer-readable medium having computer program for, when being executed by a processor, performing a method for providing augmented product specifications based on user reviews, the method comprising:

obtaining input data of specifications and user reviews on a plurality of products, each product corresponding to a plurality of specifications and a plurality of user reviews, each specification including at least a pair of a feature and a feature-value of the product;

concatenating the user reviews of the products to form product-documents, each product-document corresponding to the concatenated user reviews of the product;

employing a topic model to process the input data and learn topic distributions in the product-documents and word distributions in topics, the topics including specifications of the products, the topic model being a type of statistical model for discovering topics that occur in a collection of product-documents, each product-document containing one or more topics, and each topic existing in one or more documents, the topics including specification-topics and review-topics, comprising:

obtaining prior knowledge including known topic distributions in the product-documents and known word distributions in the topics, and obtaining a type of each word, wherein the type of the word identifies whether the word is a product-specific word or a specification word, and
the prior knowledge of known topic distributions in the product-documents further includes known specification-topic distributions in the product-documents and known review-topic distribution in the product-documents separately;
incorporating the prior knowledge and employing the topic model to process the input data and learn the topic distributions in the product-documents and the word distributions in the topics; and
obtaining an outcome from the topic model, the outcome including learned topic distributions in the product-documents and learned word distributions in the topics; and
providing augmented specifications to a user based on the topic model, the augmented specifications including one or more of relevant sentences of the feature-value, feature importance information, and product-specific words of the product, wherein providing augmented specifications based on the topic model further comprises:
when the user hovers a cursor on a product feature-value, displaying the relevant sentences in a float box according to a position of the cursor;
ranking and displaying the feature importance information in a separate column corresponding to the product features; and
displaying the product-specific words in a separate row, wherein the font size and color of the word corresponds to how specific the word is to the product; and
wherein, provided that, the prior knowledge about a distribution of a specific word w in a feature topic f is denoted as p (w|f),
the known word distributions in the feature-topics follows Zipf's law distribution;

a new prior p'(w|f) for each word w is defined as:

$$p'(w|f) = \begin{cases} \frac{p(w|f)}{\sum_{w \in v(f)} p(w|f)} \sum_{i=1}^{|v(f) \cap V|} Zipf(i) & \text{if } w \in v(f) \\ Zipf(\text{rank}_f(w)) & \text{otherwise} \end{cases}$$

wherein v(f) is a vocabulary in f, V is a vocabulary in all reviews, $\text{rank}_f(w)$ is w's rank in p(w|f) excluding words in v(f), and Zipf's law distribution function Zipf(i) is defined as $$Zipf(i) = \frac{1/i^s}{\sum_{n=1}^{|V|} 1/n^s}$$

wherein s is a parameter characterizing the distribution.

10. The non-transitory computer-readable medium according to claim 9, wherein
the topic model is a Latent Dirichlet Allocation (LDA) model;
the topic distributions in the product-documents follow a Dirichlet distribution; and
the word distributions in the topics follow a Dirichlet distribution.

11. The non-transitory computer-readable medium according to claim 9, wherein obtaining the prior knowledge further comprises:
obtaining a type of each specification word, wherein the type of the specification word identifies whether the word is a feature word or a feature-value word.

* * * * *